United States Patent
Lin et al.

(10) Patent No.: US 11,454,709 B2
(45) Date of Patent: Sep. 27, 2022

(54) OPTICAL COUPLER FOR LIDAR SENSOR

(71) Applicant: OURS Technology, LLC, Mountain View, CA (US)

(72) Inventors: Sen Lin, Santa Clara, CA (US); Andrew Steil Michaels, Santa Clara, CA (US)

(73) Assignee: OURS Technology, LLC, Mountain View, CA (US)

(*) Notice: Subject to any disclaimer, the term of this patent is extended or adjusted under 35 U.S.C. 154(b) by 0 days.

(21) Appl. No.: 17/531,029

(22) Filed: Nov. 19, 2021

(65) Prior Publication Data

US 2022/0163639 A1    May 26, 2022

Related U.S. Application Data

(60) Provisional application No. 63/117,316, filed on Nov. 23, 2020.

(51) Int. Cl.
| | | |
|---|---|---|
| *G01S 7/481* | (2006.01) | |
| *G01S 17/931* | (2020.01) | |
| *G01S 17/34* | (2020.01) | |
| *G02B 6/02* | (2006.01) | |

(52) U.S. Cl.
CPC ............ *G01S 7/4818* (2013.01); *G01S 17/34* (2020.01); *G01S 17/931* (2020.01); *G02B 6/021* (2013.01)

(58) Field of Classification Search
CPC ...... G01S 7/4818; G01S 17/34; G01S 17/931; G02B 6/021
See application file for complete search history.

(56) References Cited

U.S. PATENT DOCUMENTS

| | | |
|---|---|---|
| 10,983,273 B1* | 4/2021 | Phare ............... G01S 17/42 |
| 2004/0156589 A1 | 8/2004 | Gunn et al. |
| 2009/0154871 A1 | 6/2009 | Pyo et al. |
| 2017/0168236 A1 | 6/2017 | Huang et al. |
| 2019/0162908 A1 | 5/2019 | Moebius et al. |
| 2020/0150241 A1 | 5/2020 | Byrnes et al. |

FOREIGN PATENT DOCUMENTS

WO    WO-2021003717 A1 *    1/2021

OTHER PUBLICATIONS

NPL1 (Year: 2020).*
International Searching Authority, Patent Cooperation Treaty, Written Opinion of the International Searching Authority, International Application No. PCT/US2021/060393, Notification dated Feb. 24, 2022, 13 pages.

* cited by examiner

*Primary Examiner* — Luke D Ratcliffe
*Assistant Examiner* — Sanjida Naser
(74) *Attorney, Agent, or Firm* — Freestone Intellectual Property Law PLLC; Aaron J. Visbeek; Andrew J. Cameron

(57) ABSTRACT

A light detection and ranging (LIDAR) device includes a waveguide, cladding, and a scattering array. The waveguide is configured to route an infrared optical field. The cladding is disposed around the waveguide. The scattering array is formed in the cladding. The scattering array is configured to perturb the infrared optical field routed by the waveguide to direct the infrared optical field into an infrared beam propagating toward a surface of the cladding.

19 Claims, 9 Drawing Sheets

OPTICAL COUPLER FOR LIDAR SENSOR

CROSS-REFERENCE TO RELATED APPLICATIONS

This application claims priority to U.S. provisional Application No. 63/117,316 filed Nov. 23, 2020, which is hereby incorporated by reference.

TECHNICAL FIELD

This disclosure relates generally to optics and in particular to light detection and ranging (LIDAR).

BACKGROUND INFORMATION

Frequency Modulated Continuous Wave (FMCW) LIDAR directly measures range and velocity of an object by directing a frequency modulated, collimated light beam at a target. Both range and velocity information of the target can be derived from FMCW LIDAR signals. Designs and techniques to increase the accuracy of LIDAR signals are desirable.

The automobile industry is currently developing autonomous features for controlling vehicles under certain circumstances. According to SAE International standard J3016, there are 6 levels of autonomy ranging from Level 0 (no autonomy) up to Level 5 (vehicle capable of operation without operator input in all conditions). A vehicle with autonomous features utilizes sensors to sense the environment that the vehicle navigates through. Acquiring and processing data from the sensors allows the vehicle to navigate through its environment. Autonomous vehicles may include one or more LIDAR devices for sensing its environment. Conventional LIDAR systems require mechanical moving parts to steer the laser beam used for imaging the sensing environment. They are considered bulky, costly and unreliable for many applications, such as automotive and robotics.

BRIEF SUMMARY OF THE INVENTION

Implementations of the disclosure include a light detection and ranging (LIDAR) device including a waveguide, a cladding, and a scattering layer. The waveguide is configured to route an infrared optical field. The cladding is disposed around the waveguide. The scattering array is formed in the cladding. The scattering array is configured to perturb the infrared optical field routed by the waveguide to direct the infrared optical field into an infrared beam propagating toward a surface of the cladding.

In an implementation, the scattering array is spaced apart from the waveguide by a particular spacing distance and the waveguide is disposed between the scattering array and the surface of the cladding.

In an implementation, the LIDAR device includes a substrate layer interfacing with the cladding. The scattering array is disposed between the waveguide and an interface of the substrate layer and the cladding.

In an implementation, the LIDAR device further includes a reflector layer formed in the cladding. The waveguide is disposed between the reflector layer and the scattering array. The reflector layer is configured to direct the infrared beam to exit through the substrate layer.

In an implementation, a thickness between the scattering array and the interface and a spacing distance between the waveguide and the scattering array are configured to increase an intensity of the infrared beam by destructively interfering down-scattered portions of the infrared optical field.

In an implementation, the scattering array is also configured to couple a received infrared beam into the waveguide and the received infrared beam is a reflection of the infrared beam by a target in an external environment of the LIDAR device.

In an implementation, the cladding is transparent to the infrared optical field.

In an implementation, the waveguide has a first refractive index that is higher than a second refractive index of the cladding.

In an implementation, the waveguide is tapered and flares outward as the waveguide approaches the scattering array. The scattering array may progressively flares outward.

In an implementation, a polarization orientation of the infrared beam matches a long direction of scatterers in the scattering array.

In an implementation, the LIDAR device further includes a second waveguide. A first taper of the waveguide extends into a second taper of the second waveguide. The scattering array is a two-dimensional coupler configured to scatter the infrared optical field in a first polarization orientation and configured to scatter a second infrared optical field in a second polarization orientation. The second infrared optical field is routed by the second waveguide.

In an implementation, the infrared optical field routed in the waveguide propagates orthogonal to the second infrared optical field propagating in the second waveguide.

In an implementation, the waveguide and the second waveguide are formed in a same layer.

In an implementation, the waveguide is silicon nitride.

Implementations of the disclosure include an autonomous vehicle control system for an autonomous vehicle including a LIDAR device and one or more processors. The LIDAR device includes a waveguide, a cladding, and a scattering layer. The waveguide is configured to route an infrared optical field. The cladding is disposed around the waveguide. The scattering array is formed in the cladding. The scattering array is configured to perturb the infrared optical field routed by the waveguide to direct the infrared optical field into an infrared transmit beam. The one or more processors are configured to control the autonomous vehicle in response to an infrared returning beam that is a reflection of the infrared transmit beam.

In an implementation, a polarization orientation of the infrared transmit beam matches a long direction of scatterers in the scattering array.

In an implementation, the LIDAR device further includes second waveguide. The scattering array is a two-dimensional coupler configured to scatter the infrared optical field in a first polarization orientation and configured to scatter a second infrared optical field in a second polarization orientation. The second infrared optical field is routed by the second waveguide.

In an implementation, the scattering array is spaced apart from the waveguide by a particular spacing distance.

Implementations of the disclosure include an autonomous vehicle including a LIDAR sensor and one or more processors. The LIDAR device includes a waveguide, a cladding, and a scattering layer. The waveguide is configured to route an infrared optical field. The cladding is disposed around the waveguide. The scattering array is formed in the cladding. The scattering array is configured to perturb the infrared optical field routed by the waveguide to direct the infrared optical field into an infrared transmit beam. The one or more processors are configured to control the autonomous vehicle in response to an infrared returning beam that is a reflection of the infrared transmit beam.

In an implementation, a polarization orientation of the infrared transmit beam matches a long direction of scatterers in the scattering array

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1A:
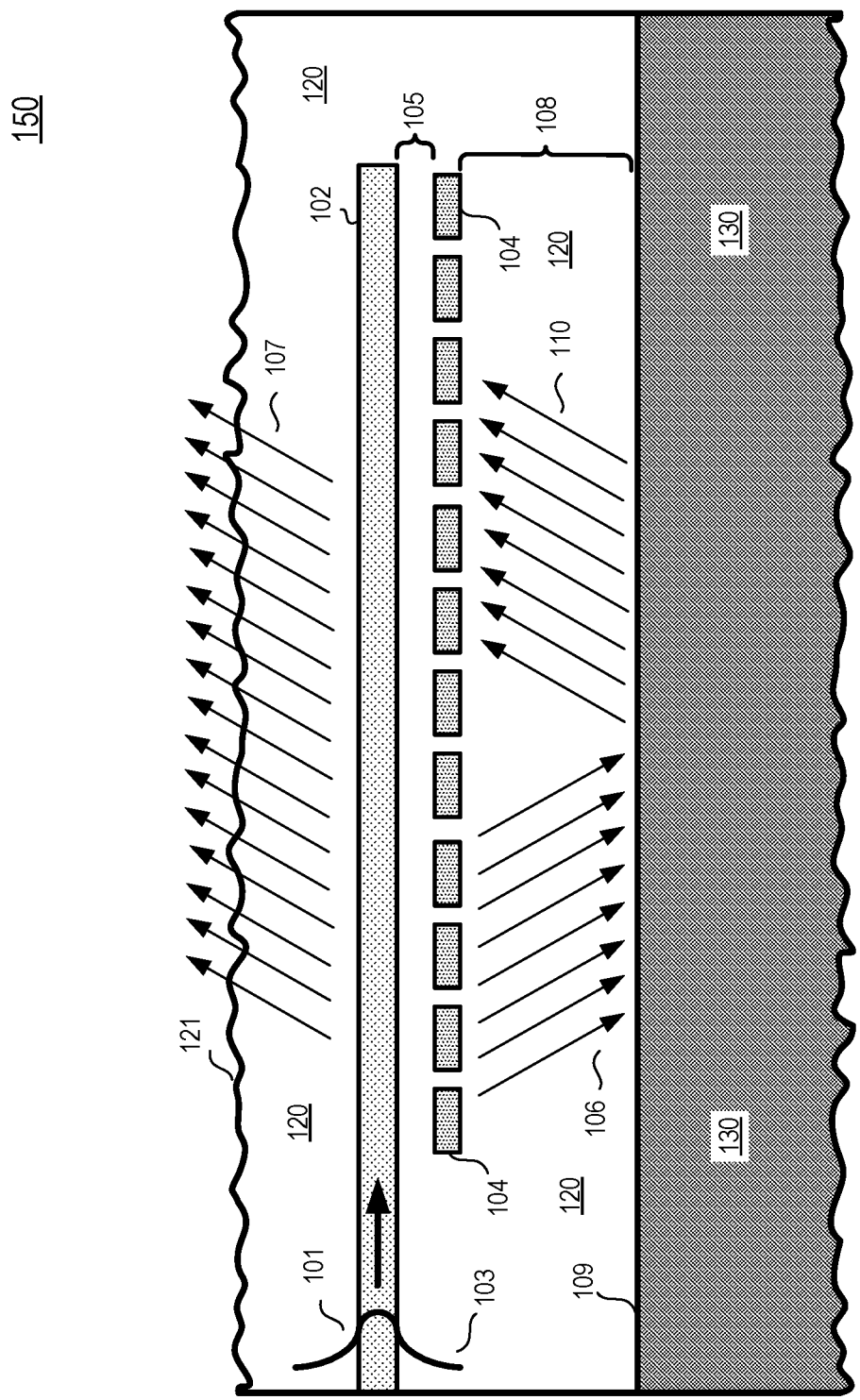
FIG. 1A illustrates a cross section of an optical coupler emitting a light beam in an upward direction, in accordance with implementations of the disclosure.

Implementations of LIDAR optical couplers are described herein. In the following description, numerous specific details are set forth to provide a thorough understanding of the implementations. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

Throughout this specification, several terms of art are used. These terms are to take on their ordinary meaning in the art from which they come, unless specifically defined herein or the context of their use would clearly suggest otherwise. For the purposes of this disclosure, the term "autonomous vehicle" includes vehicles with autonomous features at any level of autonomy of the SAE International standard J3016.

Solid-state LIDAR devices are an improvement over the mechanical moving parts of conventional LIDAR by reducing or eliminating mechanically moving parts required to steer the optical beam for LIDAR operation. An important component in solid-state LIDAR systems is the optical coupler which emits and/or receives light. Optical efficiency is an important aspect of the optical coupler.

Frequency Modulated Continuous Wave (FMCW) LIDAR directly measure range and velocity of an object/target by directing a frequency modulated, collimated light beam at the object. The light that is reflected from the object/target is combined with a tapped version of the beam. The frequency of the resulting beat tone is proportional to the distance of the object from the LIDAR system once corrected for the doppler shift that requires a second measurement. The two measurements, which may or may not be performed at the same time, provide both range and velocity information.

An important consideration in the design of solid-state FMCW LIDAR systems is power handling capabilities. Increased power handling enables improved Signal to Noise Ratio (SNR) and longer distance range performance. Developing an integrated optical platform that is an efficient manipulation of light while retaining high power-handling capabilities is desirable for high performance FMCW LIDAR systems.

Implementations of the disclosure include a LIDAR device including a waveguide, cladding, and a scattering array to direct the infrared optical field into an infrared beam exiting a surface of the cladding or a substrate (e.g. silicon substrate) that supports the waveguide and cladding. The LIDAR device may include a reflector layer configured to direct the infrared beam to exit through the substrate layer. The scattering array may also be configured to couple a received infrared beam into the waveguide where the received infrared beam is a reflection of the infrared beam by a target in an external environment of the LIDAR device. The scattering array may be quasi-periodic. In some implementations, a second waveguide extends into the waveguide and the scattering array is a two-dimensional coupler configured to scatter the infrared optical field in a first polarization orientation and configured to scatter a second infrared optical field (routed by the second waveguide) in a second polarization orientation that is orthogonal to the first polarization orientation. These and other implementations are described in more detail in connection with FIGS. 1A-5C.

FIG. 1A illustrates a cross section of an optical coupler 150 emitting light beam 107 in an upward direction, in accordance with implementations of the disclosure. Optical coupler 150 includes a waveguide 102, cladding 120, a scattering array 104, and a substrate layer 130. Waveguide 102 may be a silicon nitride slab, in an implementation. Cladding 120 is an oxide, in an implementation. Cladding 120 is silicon dioxide, in an implementation. Cladding 120 may be transparent to infrared light. Waveguide 102 may have a first refractive index that is higher than a second refractive index of cladding 120. Substrate layer 130 may be a silicon wafer substrate. In FIG. 1A, substrate layer 130 is illustrated as interfacing with cladding 120 at an interface 109. When cladding 120 is silicon dioxide and substrate layer 130 is silicon, interface 109 may be considered a silicon-glass interface.

Scattering array 104 is spaced apart from waveguide 102 by a spacing distance 105 of cladding 120, in FIG. 1A. Scattering array 104 may be quasi-periodic. Scattering array 104 may include silicon scatters that may be formed of silicon. FIG. 1A includes twelve scatterers for illustration purposes although more or fewer scatters may be utilized. Scattering array 104 is disposed between waveguide 102 and interface 109, in the illustrated implementation of FIG. 1A.

In operation, an optical mode 101 propagates through waveguide 102. Optical mode 101 may be an infrared optical field having a narrow linewidth. Optical mode 101 may be generated from laser light coupled into waveguide 102. The tails 103 of optical mode 101 extends outside waveguide 102. Waveguide 102 is configured to route optical mode 101. As optical mode 101 propagates, the tails 103 interact with the scattering array of silicon scatterers 104 which causes light to scatter out of the waveguide 102 (e.g. a silicon nitride slab). Although FIG. 1A illustrates the scatterers 104 as a single thickness, width, and spacing, these scatterers can have varying thicknesses, widths, and spacings in order to shape the generated beam of light 107 to a particular shape. Depending on the spacing distance 105 (which may be an oxide spacer thickness) along with the duty factor of the scatterers 104, the strength of this scattering can be controlled. In an implementation, scattering array 104 is configured to perturb an infrared optical field 101 that is routed by a silicon-nitride waveguide 102 to direct infrared optical field 101 into an infrared beam 107 propagating toward surface 121 of cladding 120.

Light is scattered in both the downward (e.g. down-scattered light 106) and upward (e.g. beam 107) directions. Light scattered downwards propagates through spacing distance 105, scatterers 104, and oxide thickness 108, eventually partially reflecting off of a silicon-glass interface 109 as light 110. Thicknesses of 102, 104, 105, and 108 may be configured to cause destructive interference to optical waves propagating through interface 109, thereby increasing the optical power which propagates in the upwards direction as beam 107. The net effect is an upwards-propagating beam of light 107 which contains the majority of optical power contained in optical mode 101. In an implementation, spacing distance 105 and thickness 108 in cladding 120 are configured to increase an intensity of beam 107 by destructively interfering down-scattered portions 106 of optical field 101. Since beam 107 exits through surface 121 of cladding 120, optical structure 150 may be considered a vertical optical coupler that is surface-emitting rather than edge emitting. Surface-emitting optical couplers may be advantageous for LIDAR systems and devices.

Figure 1B:
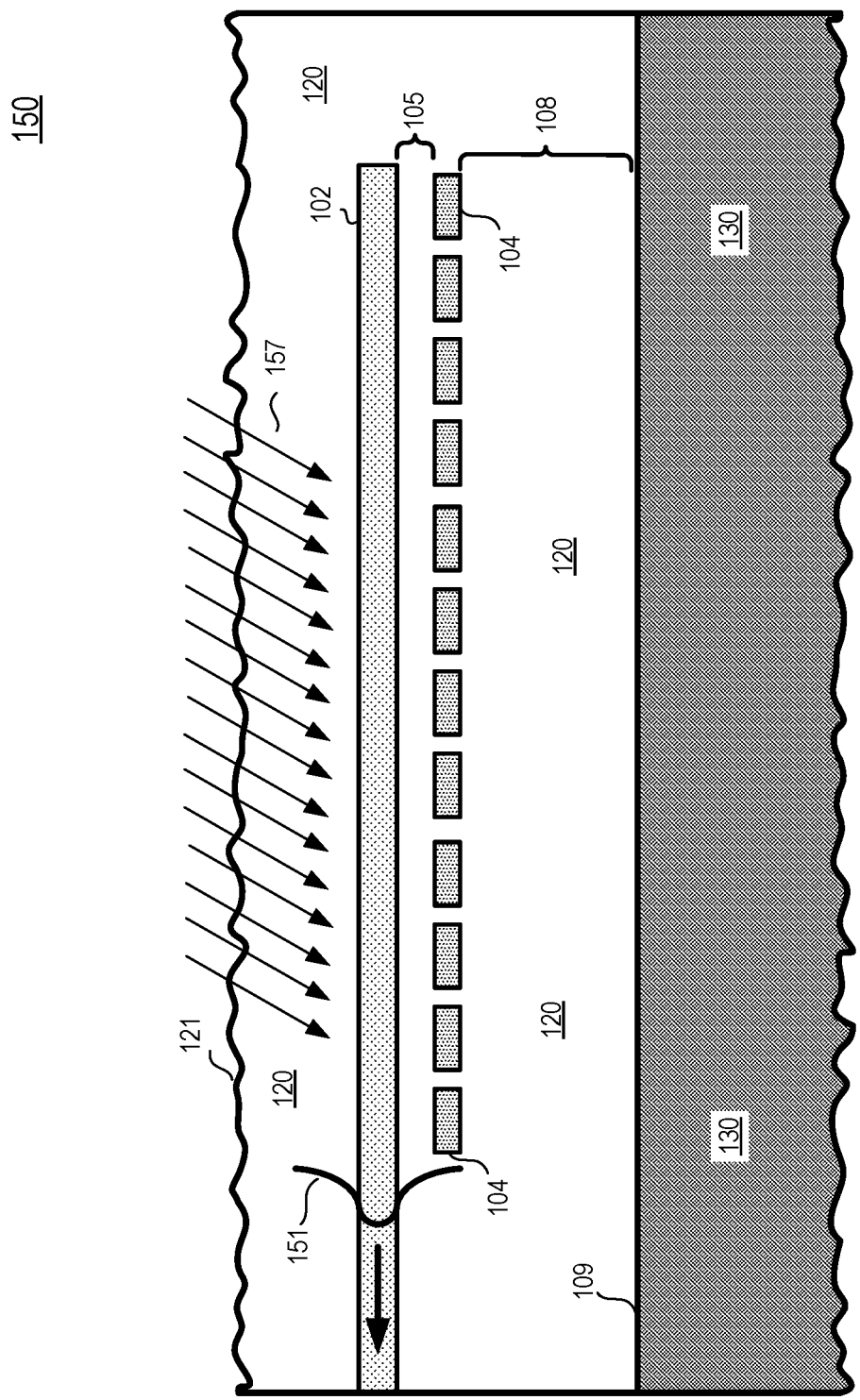
FIG. 1B illustrates a received beam propagating through a surface and being coupled into an optical mode propagating in a waveguide, in accordance with implementations of the disclosure.

In addition to being a transmit optical coupler that transmits beam 107, optical structure 150 may also function as a receive optical coupler that receives incident light and couples the light into waveguide 102. FIG. 1B illustrates received beam 157 propagating through surface 121 and being coupled into optical mode 151 propagating in waveguide 102 in an opposite direction as optical mode 101. Therefore, scattering array 104 (and spacing distance 105 and thickness 108) may also be configured to couple a received beam 157 into waveguide 102. Received beam 157 may be a received infrared beam that is a reflection of infrared beam 107 reflecting of a target in an external environment of optical structure 150 when optical structure 150 is included in a LIDAR device. Hence, optical mode 151 may be converted into a received electrical signal in a LIDAR context.

Figure 2:
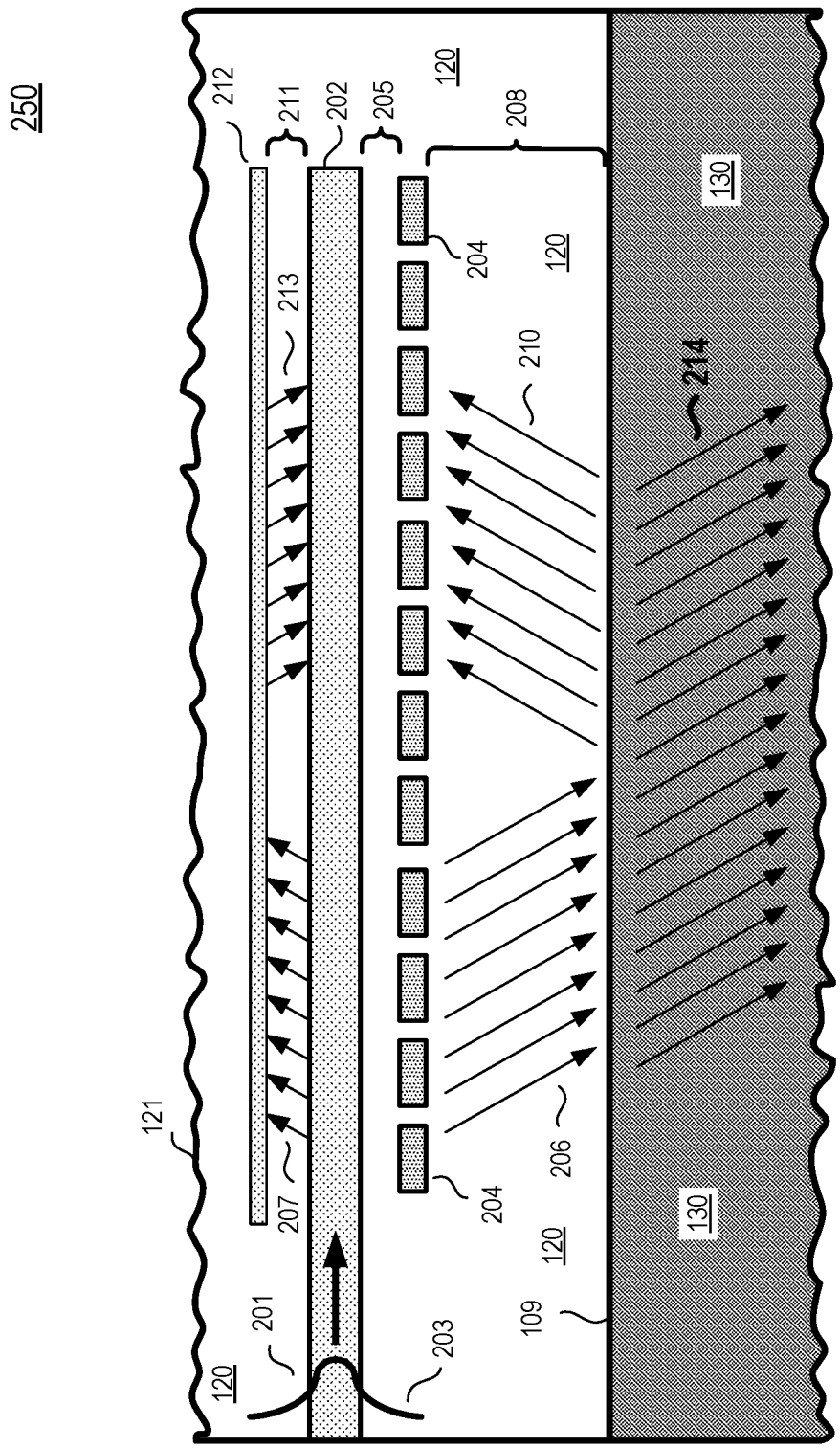
FIG. 2 illustrates a cross section of an optical coupler including a reflector layer configured to direct light to exit the optical coupler through a substrate layer, in accordance with implementations of the disclosure.

FIG. 2 illustrates a cross section of an optical coupler 250 including a reflector layer 212 configured to direct light to exit optical coupler 250 through substrate layer 130, in accordance with implementations of the disclosure. In this implementation, substrate layer 130 is transparent to infrared light. Reflector layer 212 may be a metallic reflector layer, such as copper. Reflector layer 212 may also be a diffractive structure configured to reflect the linewidth of beam 207. Reflector layer 212 is formed in cladding 120. Waveguide 202 is disposed between reflector layer 212 and scattering array 204. Scattering array 204 may be quasi-periodic. In operation, optical mode 201 propagates through waveguide 202. Optical mode 201 may include the characteristics associated with optical mode 101. Waveguide 202 may have the features associated with waveguide 102, in some implementations. Tails 203 of optical mode 201 extend outside of the waveguide material. Tails 203 interact with scattering array of scatterers 204 which causes light to scatter out of the waveguide 202 as beam 207. Depending on the spacing distance 205 in cladding 120, along with the duty factor of the scatterers 204, the strength of this scattering can be controlled and designed.

Light is scattered in both the downward (206) and upward (207) directions, in FIG. 2. Light scattered downwards propagates through the spacing distance 205, scatterers 204, and thickness 208, eventually partially reflecting off of an interface 109 as light 210. Light which is scattered in the upwards direction as beam 207 passes through a spacing dimension 211 and encounters reflector layer 212 which reflects a significant majority of the light downwards as beam 213. By controlling the thicknesses of 202, 204, 205, 208, and 211, the optical waves which transmit through the interface 209 (including beam 213) can be made to constructively interfere, forming a downward-propagating beam of light 214 which contains a significant majority of the power in the input mode 201. Since beam 214 exits through the bottom side of substrate layer 130, optical structure 250 may be considered a vertical optical coupler that is surface-emitting rather than edge emitting.

Figure 3A:
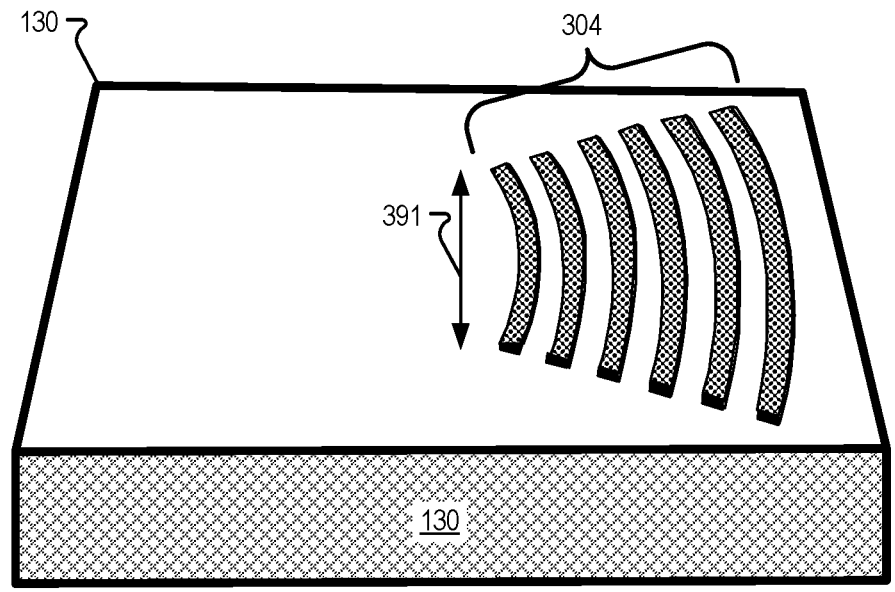
FIGS. 3A-3C illustrate layers of a three-dimensional perspective of a single-polarization (1D) optical coupler which has an optional top metallic reflector, in accordance with implementations of the disclosure.
Figure 3B:
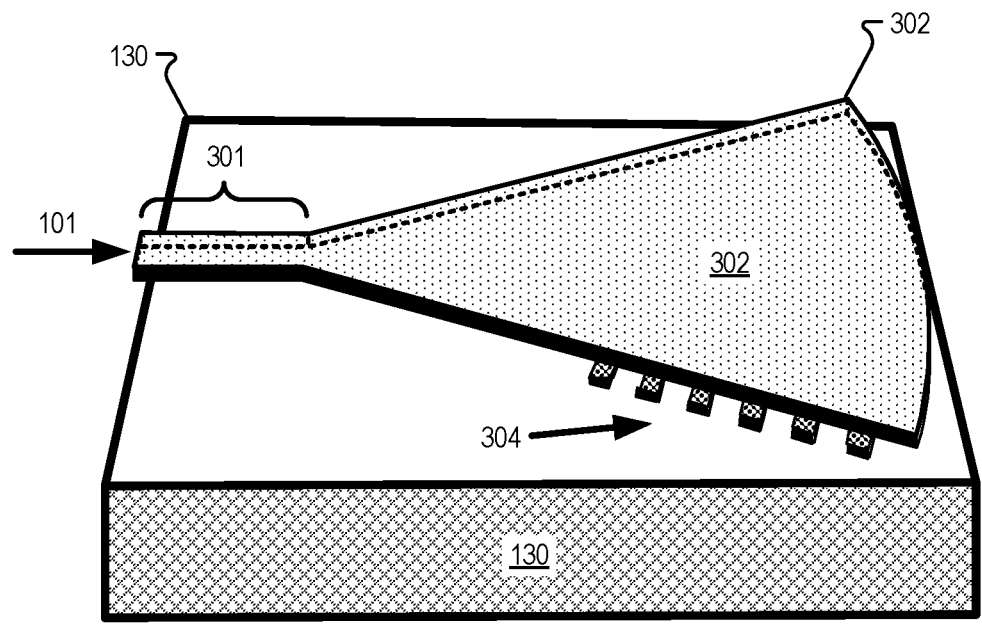
Figure 3C:
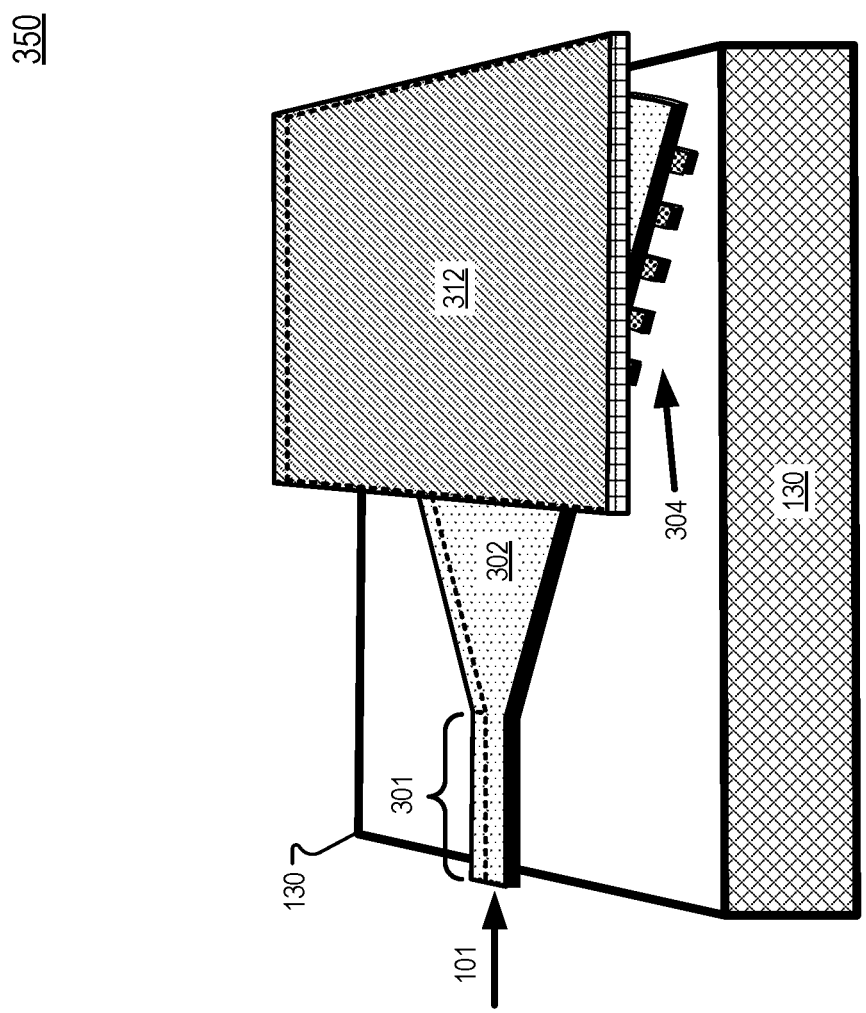

FIGS. 3A-3C illustrate layers of a three-dimensional perspective of a single-polarization (1D) optical coupler 350 which has an optional top metallic reflector 312, in accordance with implementations of the disclosure. Optical coupler 350 may be a hybrid silicon-silicon nitride optical coupler. FIG. 3A illustrates scattering array 304 disposed over substrate layer 130. Scattering array 304 may be quasi-periodic. FIGS. 3A-3C do not specifically illustrate cladding 120 so as not to obscure the other components of optical coupler 350. However, a thickness (e.g. thickness 108) of cladding 120 would support scattering array 304, for example. Cladding 120 may also support waveguide 301 and reflector layer 312.

FIG. 3B illustrates a waveguide 301 connecting to a tapered silicon nitride slab 302 which expands the input optical mode 101 to the desired size. Waveguide 301 is tapered and flares outward as the waveguide approaches scattering array 304, in the illustrated implementation. Waveguide 301 and tapered nitride slab 302 may be a contiguous material of silicon nitride. Waveguide 301 and slab 302 are disposed over scattering array 304 which control the scattering of light out of the silicon nitride slab 302. The polarization state of emitted light (e.g. beam 214), and by extension, the polarization state of light which is efficiently received matches the long direction 391 of the scatterers of scattering array 304. In an implementation, a polarization orientation of an infrared beam (generated by scattering array 304) matches a long direction of the scatters of scattering array 304.

FIG. 3C illustrates optional reflector layer 312 disposed above slab 302. Reflector layer 312 extends across an area comparable to or larger than the area occupied by the scatterers of scattering array 304. Substrate layer 130 may act as an additional reflective interface which can be used to control the coupling of light into and out of the input waveguide 301. Other waveguide designs may be utilized in optical coupler 350 besides tapered slab depicted by 302. In an implementation, a straight non-tapered slab could be used to the same effect. Additionally, a transition between input waveguide 301 and slab 302 may be adjusted.

Figure 4A:
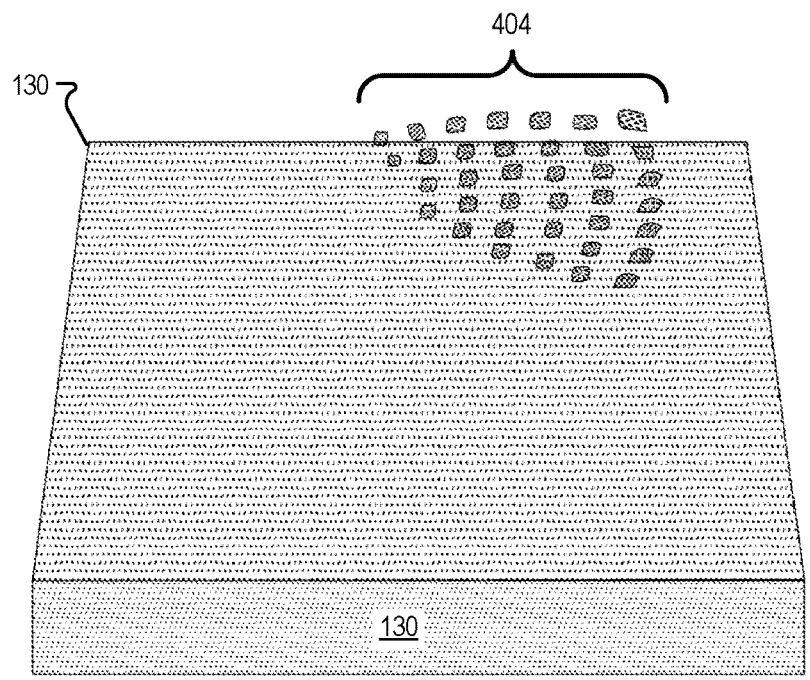
FIGS. 4A-4B illustrate layers of a three-dimensional perspective of a dual-polarization (2D) optical coupler without an optional reflector layer, in accordance with implementations of the disclosure.
Figure 4B:
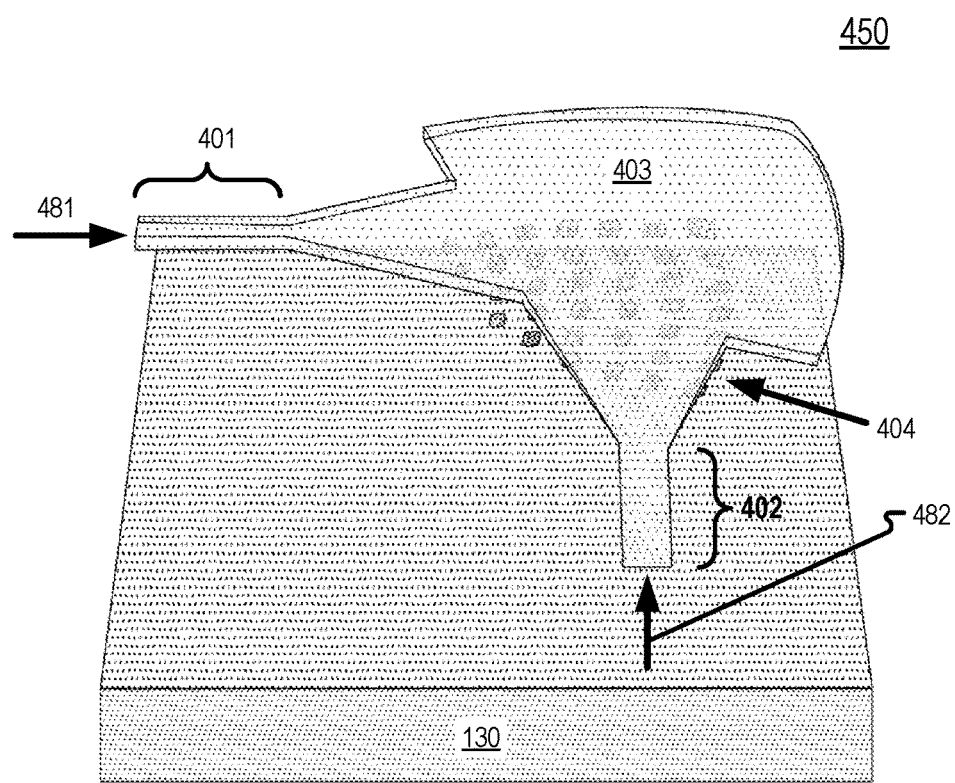

FIGS. 4A-4B illustrate layers of a three-dimensional perspective of a dual-polarization (2D) optical coupler 450 without an optional reflector layer, in accordance with implementations of the disclosure. Optical coupler 450 may be a hybrid silicon-silicon nitride optical coupler. FIG. 4A illustrates scattering array 404 disposed over substrate layer 130. Scattering array 404 may be quasi-periodic. FIGS. 4A-4B do not specifically illustrate cladding 120 so as not to obscure the other components of optical coupler 450. However, a thickness (e.g. thickness 108) of cladding 120 would support scattering array 404, for example. Cladding 120 may also support waveguide 401 and 402.

FIG. 4B illustrates a two-input waveguide 401 and 402 connecting to slab 403 which expands the optical mode from either input waveguide 401 or 402 to the desired size. Waveguide 401 receives optical mode 481 and waveguide 402 receives optical mode 482. Slab 403 can be likened to two 1D coupler slabs 302 (FIG. 3B) rotated by 90 degrees and merged, in some implementations. A first taper of waveguide 401 extends into a second taper of waveguide 402, in an implementation. Depending on whether light enters from waveguide 401 or 402, light is scattered in one of two orthogonal polarization states by scattering array 404. Optical mode 481 will be scattered by scattering array 404 in a first polarization orientation and optical mode 482 will be scattered by scattering array 404 in a second polarization orientation that is orthogonal to the first polarization orientation, in some implementations.

In the illustration of FIG. 4B, optical field 481 routed by waveguide 401 propagates orthogonal to optical field 482 propagating in the waveguide 402. A polarization state of incident light (e.g. a reflection of a transmit beam emitted by optical coupler 450) on optical coupler 450 may influence which waveguide the light is routed into. In some implementations, scattering array 404 is configured to direct a first polarization orientation of incident light to waveguide 401 and configured to direct a second polarization orientation of the incident light to waveguide 402. Thus, in a dual-polarization configuration, optical couplers of this disclosure may transmit and receive light in two orthogonal polarization states.

Optical structures 150, 250, 350, and 450 may be considered integrated vertical optical couplers since they may transmit and/or receive light through a top or bottom surface of a cladding layer or substrate layer. In other words, optical structures 150, 250, 350, and 450 may be surface emitting rather than edge-emitting. These vertically propagating beams of light may be projected onto the environment to perform a LiDAR measurement.

Figure 5A:
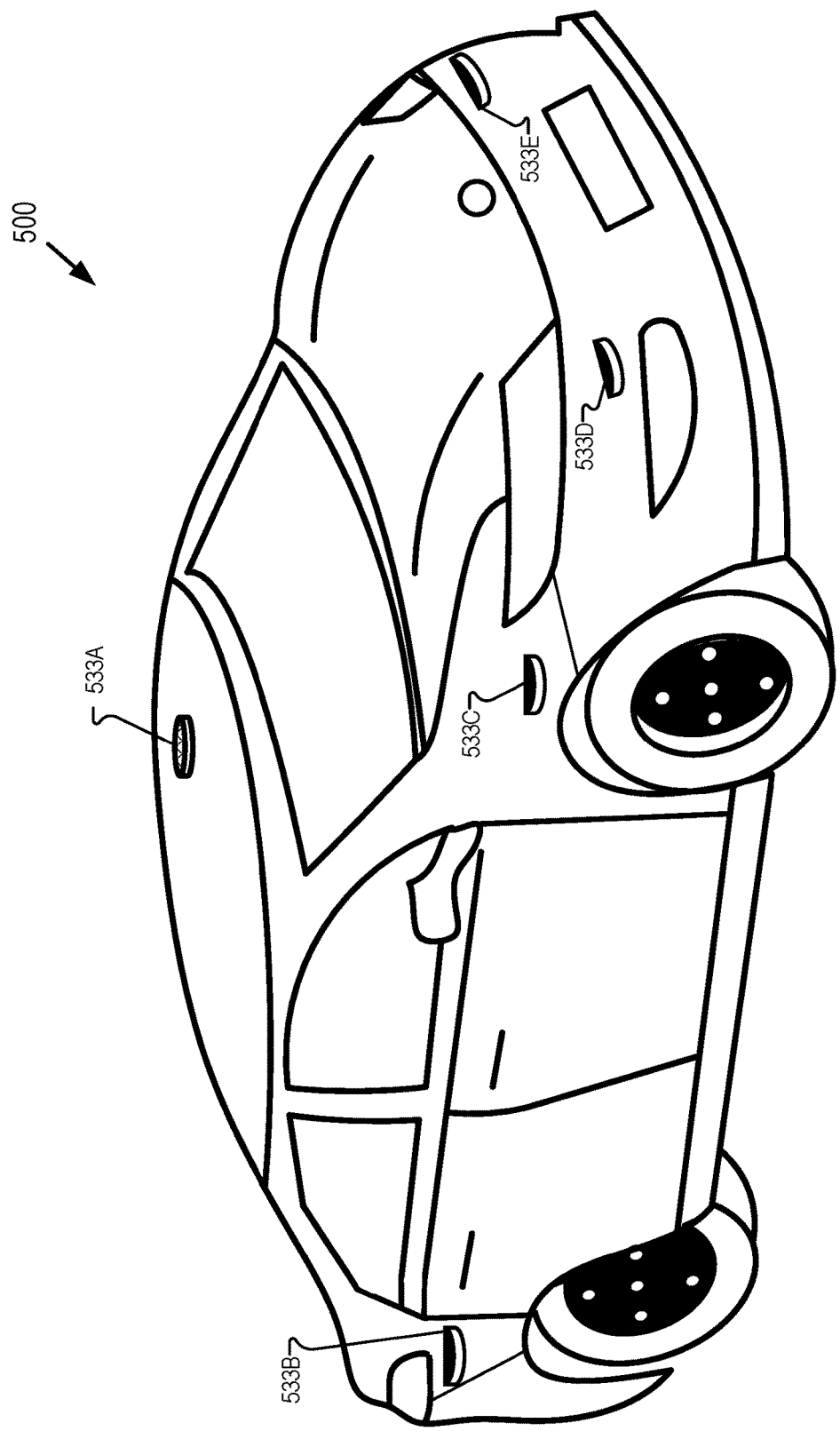
FIG. 5A illustrates an autonomous vehicle including an array of example sensors, in accordance with implementations of the disclosure.

FIG. 5A illustrates an example autonomous vehicle 500 that may include the optical structures of FIGS. 1A-4B in a LIDAR device, in accordance with aspects of the disclosure.

Figure 5B:
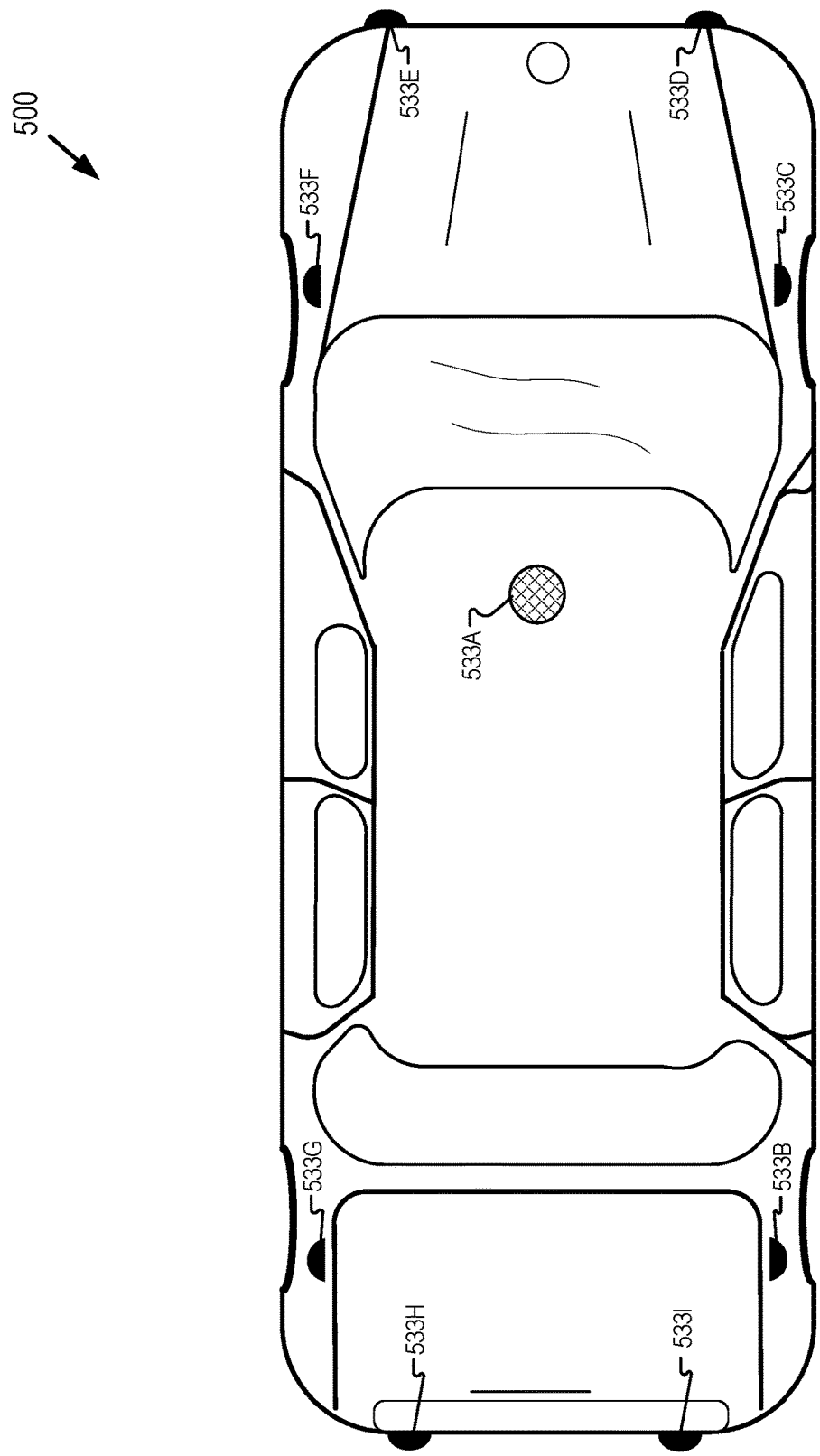
FIG. 5B illustrates a top view of an autonomous vehicle including an array of example sensors, in accordance with implementations of the disclosure.
Figure 5C:
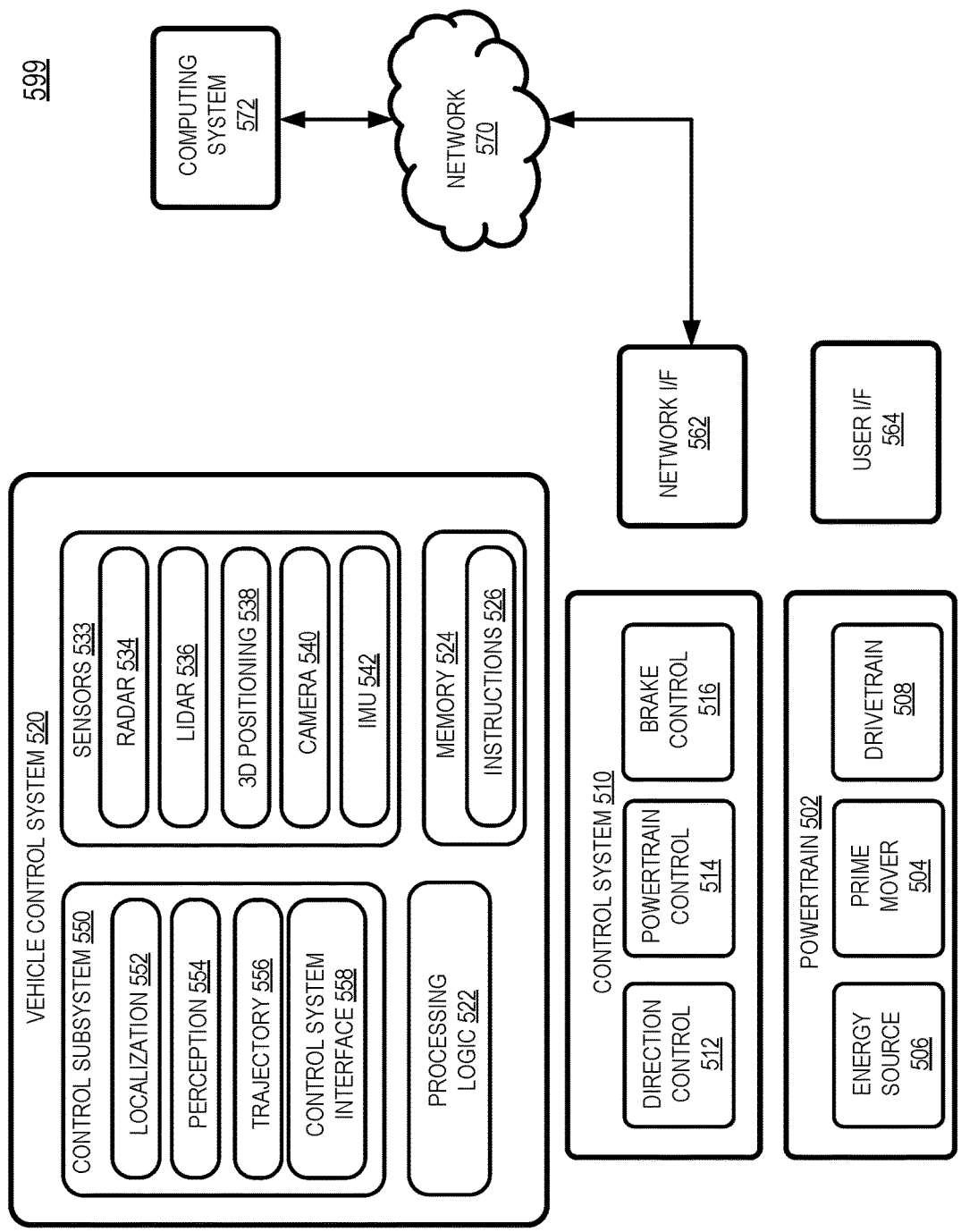
FIG. 5C illustrates an example vehicle control system including sensors, a drivetrain, and a control system, in accordance with implementations of the disclosure.

The illustrated autonomous vehicle 500 includes an array of sensors configured to capture one or more objects of an external environment of the autonomous vehicle and to generate sensor data related to the captured one or more objects for purposes of controlling the operation of autonomous vehicle 500. FIG. 5A shows sensor 533A, 533B, 533C, 533D, and 533E. FIG. 5B illustrates a top view of autonomous vehicle 500 including sensors 533F, 533G, 533H, and 533I in addition to sensors 533A, 533B, 533C, 533D, and 533E. Any of sensors 533A, 533B, 533C, 533D, 533E, 533F, 533G, 533H, and/or 533I may include LIDAR devices that include the designs of FIGS. 1A-4B. FIG. 5C illustrates a block diagram of an example system 599 for autonomous vehicle 500. For example, autonomous vehicle 500 may include powertrain 502 including prime mover 504 powered by energy source 506 and capable of providing power to drivetrain 508. Autonomous vehicle 500 may further include control system 510 that includes direction control 512, powertrain control 514, and brake control 516. Autonomous vehicle 500 may be implemented as any number of different vehicles, including vehicles capable of transporting people and/or cargo and capable of traveling in a variety of different environments. It will be appreciated that the aforementioned components 502-516 can vary widely based upon the type of vehicle within which these components are utilized.

The implementations discussed hereinafter, for example, will focus on a wheeled land vehicle such as a car, van, truck, or bus. In such implementations, prime mover 504 may include one or more electric motors and/or an internal combustion engine (among others). The energy source may include, for example, a fuel system (e.g., providing gasoline, diesel, hydrogen), a battery system, solar panels or other renewable energy source, and/or a fuel cell system. Drivetrain 508 may include wheels and/or tires along with a transmission and/or any other mechanical drive components suitable for converting the output of prime mover 504 into vehicular motion, as well as one or more brakes configured to controllably stop or slow the autonomous vehicle 500 and direction or steering components suitable for controlling the trajectory of the autonomous vehicle 500 (e.g., a rack and pinion steering linkage enabling one or more wheels of autonomous vehicle 500 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles). In some implementations, multiple electric motors (e.g., dedicated to individual wheels or axles) may be used as a prime mover.

Direction control 512 may include one or more actuators and/or sensors for controlling and receiving feedback from the direction or steering components to enable the autonomous vehicle 500 to follow a desired trajectory. Powertrain control 514 may be configured to control the output of powertrain 502, e.g., to control the output power of prime mover 504, to control a gear of a transmission in drivetrain 508, thereby controlling a speed and/or direction of the autonomous vehicle 500. Brake control 516 may be configured to control one or more brakes that slow or stop autonomous vehicle 500, e.g., disk or drum brakes coupled to the wheels of the vehicle.

Other vehicle types, including but not limited to off-road vehicles, all-terrain or tracked vehicles, or construction equipment will necessarily utilize different powertrains, drivetrains, energy sources, direction controls, powertrain controls, and brake controls, as will be appreciated by those of ordinary skill having the benefit of the instant disclosure.

Moreover, in some implementations some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, autonomous control over autonomous vehicle 500 is implemented in vehicle control system 520, which may include one or more processors in processing logic 522 and one or more memories 524, with processing logic 522 configured to execute program code (e.g. instructions 526) stored in memory 524. Processing logic 522 may include graphics processing unit(s) (GPUs) and/or central processing unit(s) (CPUs), for example. Vehicle control system 520 may be configured to control powertrain 502 of autonomous vehicle 500 in response to infrared returning beams that are a reflection of an infrared transmit beam emitted by optical structures 150, 250, 350, and/or 450 into an external environment of autonomous vehicle 500 and reflected back to optical structures 150, 250, 350, and/or 450.

Sensors 533A-533I may include various sensors suitable for collecting data from an autonomous vehicle's surrounding environment for use in controlling the operation of the autonomous vehicle. For example, sensors 533A-533I can include RADAR unit 534, LIDAR unit 536, 3D positioning sensor(s) 538, e.g., a satellite navigation system such as GPS, GLONASS, BeiDou, Galileo, or Compass. The optical coupler designs of FIGS. 1A-4B may be included in LIDAR unit 536. LIDAR unit 536 may include a plurality of LIDAR sensors that are distributed around autonomous vehicle 500, for example. In some implementations, 3D positioning sensor(s) 538 can determine the location of the vehicle on the Earth using satellite signals. Sensors 533A-533I can optionally include one or more ultrasonic sensors, one or more cameras 540, and/or an Inertial Measurement Unit (IMU) 542. In some implementations, camera 540 can be a monographic or stereographic camera and can record still and/or video images. Camera 540 may include a Complementary Metal-Oxide-Semiconductor (CMOS) image sensor configured to capture images of one or more objects in an external environment of autonomous vehicle 500. IMU 542 can include multiple gyroscopes and accelerometers capable of detecting linear and rotational motion of autonomous vehicle 500 in three directions. One or more encoders (not illustrated) such as wheel encoders may be used to monitor the rotation of one or more wheels of autonomous vehicle 500.

The outputs of sensors 533A-533I may be provided to control subsystems 550, including, localization subsystem 552, trajectory subsystem 556, perception subsystem 554, and control system interface 558. Localization subsystem 552 is configured to determine the location and orientation (also sometimes referred to as the "pose") of autonomous vehicle 500 within its surrounding environment, and generally within a particular geographic area. The location of an autonomous vehicle can be compared with the location of an additional vehicle in the same environment as part of generating labeled autonomous vehicle data. Perception subsystem 554 may be configured to detect, track, classify, and/or determine objects within the environment surrounding autonomous vehicle 500. Trajectory subsystem 556 is configured to generate a trajectory for autonomous vehicle 500 over a particular timeframe given a desired destination as well as the static and moving objects within the environment. A machine learning model in accordance with several implementations can be utilized in generating a vehicle trajectory. Control system interface 558 is configured to communicate with control system 510 in order to implement the trajectory of the autonomous vehicle 500. In some implementations, a machine learning model can be utilized to control an autonomous vehicle to implement the planned trajectory.

It will be appreciated that the collection of components illustrated in FIG. 5C for vehicle control system 520 is merely exemplary in nature. Individual sensors may be omitted in some implementations. In some implementations, different types of sensors illustrated in FIG. 5C may be used for redundancy and/or for covering different regions in an environment surrounding an autonomous vehicle. In some implementations, different types and/or combinations of control subsystems may be used. Further, while subsystems 552-558 are illustrated as being separate from processing logic 522 and memory 524, it will be appreciated that in some implementations, some or all of the functionality of subsystems 552-558 may be implemented with program code such as instructions 526 resident in memory 524 and executed by processing logic 522, and that these subsystems 552-558 may in some instances be implemented using the same processor(s) and/or memory. Subsystems in some implementations may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in vehicle control system 520 may be networked in various manners.

In some implementations, different architectures, including various combinations of software, hardware, circuit logic, sensors, and networks may be used to implement the various components illustrated in FIG. 5C. Each processor may be implemented, for example, as a microprocessor and each memory may represent the random access memory ("RAM") devices comprising a main storage, as well as any supplemental levels of memory, e.g., cache memories, non-volatile or backup memories (e.g., programmable or flash memories), or read-only memories. In addition, each memory may be considered to include memory storage physically located elsewhere in autonomous vehicle 500, e.g., any cache memory in a processor, as well as any storage capacity used as a virtual memory, e.g., as stored on a mass storage device or another computer controller. Processing logic 522 illustrated in FIG. 5C, or entirely separate processing logic, may be used to implement additional functionality in autonomous vehicle 500 outside of the purposes of autonomous control, e.g., to control entertainment systems, to operate doors, lights, or convenience features.

In addition, for additional storage, autonomous vehicle 500 may also include one or more mass storage devices, e.g., a removable disk drive, a hard disk drive, a direct access storage device ("DASD"), an optical drive (e.g., a CD drive, a DVD drive), a solid state storage drive ("SSD"), network attached storage, a storage area network, and/or a tape drive, among others. Furthermore, autonomous vehicle 500 may include a user interface 564 to enable autonomous vehicle 500 to receive a number of inputs from a passenger and generate outputs for the passenger, e.g., one or more displays, touchscreens, voice and/or gesture interfaces, buttons and other tactile controls. In some implementations, input from the passenger may be received through another computer or electronic device, e.g., through an app on a mobile device or through a web interface.

In some implementations, autonomous vehicle 500 may include one or more network interfaces, e.g., network interface 562, suitable for communicating with one or more networks 570 (e.g., a Local Area Network ("LAN"), a wide area network ("WAN"), a wireless network, and/or the Internet, among others) to permit the communication of information with other computers and electronic devices, including, for example, a central service, such as a cloud service, from which autonomous vehicle 500 receives environmental and other data for use in autonomous control thereof. In some implementations, data collected by one or more sensors 533A-533I can be uploaded to computing system 572 through network 570 for additional processing. In such implementations, a time stamp can be associated with each instance of vehicle data prior to uploading.

Processing logic 522 illustrated in FIG. 5C, as well as various additional controllers and subsystems disclosed herein, generally operates under the control of an operating system and executes or otherwise relies upon various computer software applications, components, programs, objects, modules, or data structures, as may be described in greater detail below. Moreover, various applications, components, programs, objects, or modules may also execute on one or more processors in another computer coupled to autonomous vehicle 500 through network 570, e.g., in a distributed, cloud-based, or client-server computing environment, whereby the processing required to implement the functions of a computer program may be allocated to multiple computers and/or services over a network.

Routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter may be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs) among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets), it should be appreciated that the invention is not limited to the specific organization and allocation of program functionality described herein.

Those skilled in the art, having the benefit of the present disclosure, will recognize that the exemplary environment illustrated in FIG. 5C is not intended to limit implementations disclosed herein. Indeed, those skilled in the art will recognize that other alternative hardware and/or software environments may be used without departing from the scope of implementations disclosed herein.

In implementations of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 µm.

In aspects of this disclosure, the term "transparent" may be defined as having greater than 90% transmission of light. In some aspects, the term "transparent" may be defined as a material having greater than 90% transmission of visible light.

The term "processing logic" in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I²C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A light detection and ranging (LIDAR) device comprising:
   a waveguide configured to route an infrared optical field;
   a cladding disposed around the waveguide; and
   a scattering array formed in the cladding, wherein the scattering array is configured to perturb the infrared optical field routed by the waveguide to direct the infrared optical field into an infrared beam propagating toward a surface of the cladding, wherein the scattering array is spaced apart from the waveguide by a spacing distance to allow a tail of the infrared optical field to interact with the scattering array and to scatter light out of the waveguide as the infrared beam.

2. The LIDAR device of claim 1, wherein the waveguide is disposed between the scattering array and the surface of the cladding.

3. The LIDAR device of claim 1 further comprising:
   a substrate layer interfacing with the cladding, wherein the scattering array is disposed between the waveguide and an interface of the substrate layer and the cladding.

4. The LIDAR device of claim 3 further comprising:
   a reflector layer formed in the cladding, wherein the waveguide is disposed between the reflector layer and the scattering array, and wherein the reflector layer is configured to direct the infrared beam to exit through the substrate layer.

5. The LIDAR device of claim 3, wherein a thickness between the scattering array and the interface and the spacing distance between the waveguide and the scattering array are configured to increase an intensity of the infrared beam by destructively interfering down-scattered portions of the infrared optical field.

6. The LIDAR device of claim 1, wherein the scattering array is also configured to couple a received infrared beam into the waveguide, wherein the received infrared beam is a reflection of the infrared beam by a target in an external environment of the LIDAR device.

7. The LIDAR device of claim 1, wherein the cladding is transparent to the infrared optical field.

8. The LIDAR device of claim 1, wherein the waveguide has a first refractive index that is higher than a second refractive index of the cladding.

9. The LIDAR device of claim 1, wherein the waveguide is tapered and flares outward as the waveguide approaches the scattering array, and wherein the scattering array progressively flares outward.

10. The LIDAR device of claim 1, wherein a polarization orientation of the infrared beam matches a long direction of scatterers in the scattering array.

11. The LIDAR device of claim 1 further comprising:
    a second waveguide, wherein a first taper of the waveguide extends into a second taper of the second waveguide,
    and wherein the scattering array is a two-dimensional coupler configured to scatter the infrared optical field in a first polarization orientation and configured to scatter a second infrared optical field in a second polarization orientation, the second infrared optical field routed by the second waveguide.

12. The LIDAR device of claim 11, wherein the infrared optical field routed in the waveguide propagates orthogonal to the second infrared optical field propagating in the second waveguide.

13. The LIDAR device of claim 11, wherein the waveguide and the second waveguide are formed in a same layer.

14. The LIDAR device of claim 1, wherein the waveguide is silicon nitride.

15. An autonomous vehicle control system for an autonomous vehicle, the autonomous vehicle control system comprising:
    a light detection and ranging (LIDAR) device including:
       a waveguide configured to route an infrared optical field;
       a cladding disposed around the waveguide; and
       a scattering array formed in the cladding, wherein the scattering array is configured to perturb the infrared optical field routed by the waveguide to direct the infrared optical field into an infrared transmit beam, wherein the scattering array is spaced apart from the waveguide by a spacing distance to allow a tail of the infrared optical field to interact with the scattering array and to scatter light out of the waveguide as the infrared transmit beam; and
    one or more processors configured to control the autonomous vehicle in response to an infrared returning beam that is a reflection of the infrared transmit beam.

16. The autonomous vehicle control system of claim 15, wherein a polarization orientation of the infrared transmit beam matches a long direction of scatterers in the scattering array.

17. The autonomous vehicle control system of claim 15, wherein the LIDAR device further includes:
    a second waveguide, wherein the scattering array is a two-dimensional coupler configured to scatter the infrared optical field in a first polarization orientation and configured to scatter a second infrared optical field in a second polarization orientation, the second infrared optical field routed by the second waveguide.

18. An autonomous vehicle comprising:
a light detection and ranging (LIDAR) sensor including:
a waveguide configured to route an infrared optical field;
a cladding disposed around the waveguide; and
a scattering array formed in the cladding, wherein the scattering array is configured to perturb the infrared optical field routed by the waveguide to direct the infrared optical field into an infrared transmit beam, wherein the scattering array is spaced apart from the waveguide by a spacing distance to allow a tail of the infrared optical field to interact with the scattering array and to scatter light out of the waveguide as the infrared transmit beam; and
one or more processors configured to control the autonomous vehicle in response to an infrared returning beam that is a reflection of the infrared transmit beam.

19. The autonomous vehicle of claim 18, wherein a polarization orientation of the infrared transmit beam matches a long direction of scatterers in the scattering array.

* * * * *